(12) United States Patent
Ishii et al.

(10) Patent No.: US 10,260,561 B2
(45) Date of Patent: Apr. 16, 2019

(54) ROLLING BEARING

(71) Applicant: JTEKT CORPORATION, Osaka-shi, Osaka (JP)

(72) Inventors: Yasuhiko Ishii, Kashiwara (JP); Yuya Yamamoto, Osaka (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 15/919,936

(22) Filed: Mar. 13, 2018

(65) Prior Publication Data

US 2018/0274590 A1 Sep. 27, 2018

(30) Foreign Application Priority Data

Mar. 22, 2017 (JP) ................. 2017-055561

(51) Int. Cl.
| | |
|---|---|
| *F16C 19/06* | (2006.01) |
| *F16C 33/66* | (2006.01) |
| *F16C 33/72* | (2006.01) |
| *F16C 33/38* | (2006.01) |
| *F16C 19/16* | (2006.01) |
| *F16C 33/78* | (2006.01) |

(52) U.S. Cl.
CPC .......... *F16C 33/3887* (2013.01); *F16C 19/06* (2013.01); *F16C 19/163* (2013.01); *F16C 33/6622* (2013.01); *F16C 33/782* (2013.01)

(58) Field of Classification Search
CPC ...... F16C 19/06; F16C 19/163; F16C 33/418; F16C 33/782; F16C 33/6614; F16C 33/6659; F16C 33/7823; F16C 33/7846
USPC ....... 384/470, 480, 484, 490, 523, 527, 531, 384/534
See application file for complete search history.

(56) References Cited

U.S. PATENT DOCUMENTS

| | | |
|---|---|---|
| 3,350,148 A | 10/1967 | Sanguinetti et al. |
| 3,414,275 A | 12/1968 | Takahashi |
| 4,505,484 A | 3/1985 | Ohkuma et al. |
| 4,557,612 A | 12/1985 | Neal |
| 4,655,617 A | 4/1987 | Yasui et al. |

(Continued)

FOREIGN PATENT DOCUMENTS

| | | |
|---|---|---|
| CN | 1668858 A | 9/2005 |
| CN | 102762880 A | 10/2012 |

(Continued)

OTHER PUBLICATIONS

Jan. 10, 2018 Office Action issued in U.S. Appl. No. 15/408,721.

(Continued)

*Primary Examiner* — Marcus Charles
(74) *Attorney, Agent, or Firm* — Oliff PLC

(57) ABSTRACT

A rolling bearing includes an inner ring, an outer ring, a plurality of balls, a cage, and sealing devices. An action that forces grease from one axial side to the other axial side occurs in an annular space. The cage includes an annular body provided on one axial side, and a plurality of cage prongs provided so as to extend from the annular body to the other axial side. Cage pockets that house the balls are each formed on the other axial side of the annular body and between the cage prongs adjacent to each other in a circumferential direction. The cage pockets are open to the other axial side.

9 Claims, 5 Drawing Sheets

(56) References Cited

U.S. PATENT DOCUMENTS

| | | | | |
|---|---|---|---|---|
| 4,874,073 A | * | 10/1989 | Tagawa | F16D 23/14 192/98 |
| 5,558,448 A | * | 9/1996 | Yabe | F16C 33/416 29/898.067 |
| RE36,804 E | | 8/2000 | Kajihara et al. | |
| 6,709,161 B2 | | 3/2004 | Yakura et al. | |
| 7,029,181 B2 | * | 4/2006 | Terada | F16C 33/416 384/462 |
| 7,547,146 B2 | | 6/2009 | Kinno et al. | |
| 8,523,449 B2 | | 9/2013 | Hamada et al. | |
| 8,876,395 B2 | * | 11/2014 | Sakaguchi | F16C 33/3887 384/470 |
| 9,500,232 B2 | | 11/2016 | Ishii | |
| 2006/0088235 A1 | | 4/2006 | Ueda | |
| 2007/0154124 A1 | | 7/2007 | Inoue et al. | |
| 2011/0002568 A1 | * | 1/2011 | Kawamura | F16C 33/416 384/470 |
| 2011/0142388 A1 | * | 6/2011 | Maejima | F16C 33/416 384/523 |
| 2012/0301065 A1 | | 11/2012 | Mori et al. | |
| 2017/0204908 A1 | | 7/2017 | Ishii et al. | |

FOREIGN PATENT DOCUMENTS

| | | | | |
|---|---|---|---|---|
| DE | 102009009633 A1 | * | 8/2010 | F16C 33/80 |
| FR | 1351942 A | | 2/1964 | |
| FR | 2308013 A1 | | 11/1976 | |
| FR | 3001512 A1 | | 8/2014 | |
| JP | 2004-068924 A | | 3/2004 | |
| JP | 2004100917 A | * | 4/2004 | F16C 33/78 |
| JP | 2004-211862 A | | 7/2004 | |
| JP | 2004239293 A | * | 8/2004 | F16C 33/49 |
| JP | 2004293563 A | * | 10/2004 | F16C 33/76 |
| JP | 2005-076660 A | | 3/2005 | |
| JP | 2005-233248 A | | 9/2005 | |
| JP | 2007-112920 A | | 5/2007 | |
| JP | 2009-236142 A | | 10/2009 | |
| JP | 2010-19268 A | | 1/2010 | |
| JP | 2010048326 A | * | 3/2010 | F16C 19/16 |
| JP | 2010048328 A | * | 3/2010 | F16C 33/80 |
| JP | 2010-164122 A | | 7/2010 | |
| JP | 2011043214 A | | 3/2011 | |
| JP | 2011-208662 A | | 10/2011 | |
| JP | 2012184814 A | * | 9/2012 | F16C 33/7843 |
| JP | 5636819 B2 | | 12/2014 | |
| JP | 2015-086940 A | | 5/2015 | |
| JP | 2016-023647 A | | 2/2016 | |
| JP | 2016223598 A | * | 12/2016 | F16C 33/80 |
| JP | 2017009016 A | * | 1/2017 | F16C 33/6614 |
| WO | WO-2004007983 A1 | * | 1/2004 | F04B 27/0895 |
| WO | WO-2016010057 A1 | * | 1/2016 | F16C 33/78 |
| WO | WO 2016083133 A1 | * | 6/2016 | F16C 33/78 |

OTHER PUBLICATIONS

Sep. 17, 2018 Office Action issued in U.S. Appl. No. 16/053,179.
Aug. 30, 2016 International Search Report issued in International Patent Application No. PCT/JP2016/066287.
Aug. 30, 2016 Written Opinion issued in International Patent Application No. PCT/JP2016/066287.
Jul. 31, 2018 Notice of Allowance issued in U.S. Appl. No. 15/408,721.
U.S. Appl. No. 16/144,618, filed Sep. 27, 2018 in the name of Yamamoto et al.
U.S. Appl. No. 15/408,721, filed Jan. 18, 2017 in the name of Ishii et al.
U.S. Appl. No. 16/053,179, filed Aug. 2, 2018 in the name of Ishii et al.
U.S. Appl. No. 15/928,189, filed Mar. 22, 2018 in the name of Ishii et al.
U.S. Appl. No. 15/578,482, filed Nov. 30, 2017 in the name of Ishii et al.
Jun. 28, 2018 Notice of Allowance issued in U.S. Appl. No. 15/578,482.
Jan. 2, 2019 Office Action issued in Chinese Patent Application No. 201680032114.1.
Jan. 22, 2019 Office Action issued in U.S. Appl. No. 15/928,189.

* cited by examiner

ONE AXIAL SIDE　　　　　　OTHER AXIAL SIDE

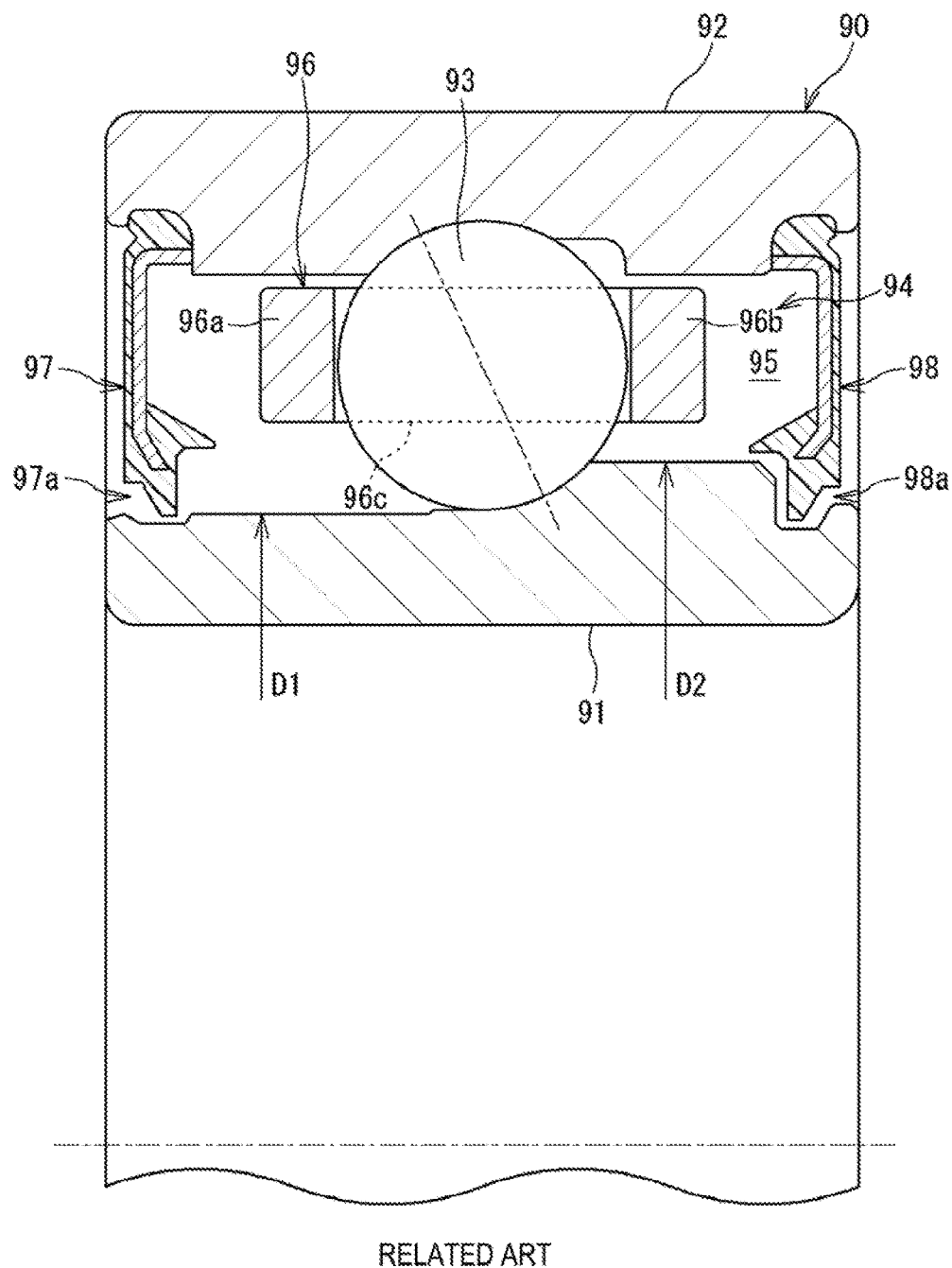

ROLLING BEARING

INCORPORATION BY REFERENCE

The disclosure of Japanese Patent Application No. 2017-055561 filed on Mar. 22, 2017 including the specification, drawings and abstract, is incorporated herein by reference in its entirety.

BACKGROUND OF THE INVENTION

1. Field of the Invention

The present invention relates to a rolling bearing.

2. Description of the Related Art

Rolling bearings configured to support rotation shafts of various types of machinery are required to have such a reliability that seizure does not occur. Therefore, grease lubrication that provides high lubricating performance is widely employed (see, for example, Japanese Patent Application Publication No. 2016-23647 (JP 2016-23647 A)).

The use of grease lubrication is proposed for rolling bearings to be used under an environment that involves high-speed rotation.

FIG. 5 is a sectional view illustrating an example of a related-art rolling bearing. In the case of grease lubrication, seals 97 and 98 serving as sealing devices are provided on both axial sides of an annular space 94 formed between an inner ring 91 and an outer ring 92. In order to achieve high-speed rotation, the seals 97 and 98 are labyrinth seals (non-contact seals). That is, labyrinth clearances 97a and 98a are formed between the inner ring 91 and the seals 97 and 98, thereby preventing leakage of grease.

A cage 96 illustrated in FIG. 5 is a so-called machined cage having a first annular portion 96a, a second annular portion 96b, and a plurality of cage bars 96c. The first annular portion 96a is located on one axial side of balls 93. The second annular portion 96b is located on the other axial side of the balls 93. The cage bars 96c couple the annular portions 96a and 96b to each other. The machined cage 96 is excellent in rotational stability, and is often used for rolling bearings in applications to high-speed rotation.

The rolling bearing illustrated in FIG. 5 is an angular contact ball bearing 90. The balls 93 are in contact with the inner ring 91 and the outer ring 92 at predetermined angles (contact angles). In the case of the angular contact ball bearing 90, a shoulder diameter D2 of the inner ring 91 on the other axial side (right side in FIG. 5) is larger than a shoulder diameter D1 of the inner ring 91 on one axial side (left side in FIG. 5) (D1<D2). Therefore, when the angular contact ball bearing 90 (inner ring 91) rotates, a centrifugal force causes an action that forces the grease in the annular space 94 from one axial side to the other axial side (from the left side to the right side in FIG. 5). This action intensifies particularly when the bearing rotates at a high speed. Thus, the grease in the annular space 94 concentrates in a space 95 on the other axial side, thereby causing imbalance in the grease.

When the grease concentrates in the space 95 on the other axial side, the grease is agitated by the second annular portion 96b of the rotating cage 96. Due to influence of the agitation, the grease is likely to pass through the labyrinth clearance 98a, thereby causing a problem of leakage of the grease. The leakage of the grease leads to insufficient lubrication, which may cause troubles such as seizure, temperature rise, and wear. The grease that concentrates in the space 95 is agitated and sheared by the second annular portion 96b, and the life of the grease may be shortened.

The action that forces the grease from one axial side to the other axial side due to the rotation of the bearing may also be caused by factors other than the structure in which the shoulder diameters D1 and D2 of the inner ring 91 are different from each other. Although illustration is omitted, the action that forces the grease from one axial side to the other axial side may be caused, for example, when a shoulder diameter of the outer ring on the other axial side is larger than a shoulder diameter of the outer ring on one axial side, or when rolling elements (balls) spin along with the rotation of the bearing. Even if the sealing device is not the labyrinth seal but a contact seal, the problem of leakage of the grease to the outside of the bearing occurs.

SUMMARY OF THE INVENTION

It is one object of the present invention to suppress leakage of grease from a sealing device on the other axial side in a rolling bearing in which an action that forces the grease from one axial side to the other axial side occurs in an annular space formed between an inner ring and an outer ring.

A rolling bearing according to one aspect of the present invention has the following features in its structure. That is, the rolling bearing includes an inner ring, an outer ring, a plurality of rolling elements, a cage, and sealing devices. The rolling elements are provided between the inner ring and the outer ring. The cage is configured to retain the rolling elements. The sealing devices are provided on one axial side and the other axial side of an annular space formed between the inner ring and the outer ring. An action that forces grease from the one axial side to the other axial side occurs in the annular space. The cage includes an annular body and a plurality of cage prongs. The annular body is provided on the one axial side. The cage prongs are provided so as to extend from the annular body to the other axial side. Cage pockets that house the rolling elements are each formed on the other axial side of the annular body and between the cage prongs adjacent to each other in a circumferential direction. The cage pockets are open to the other axial side.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5 is a sectional view illustrating an example of a related-art rolling bearing.

DETAILED DESCRIPTION OF EMBODIMENTS

Figure 1:
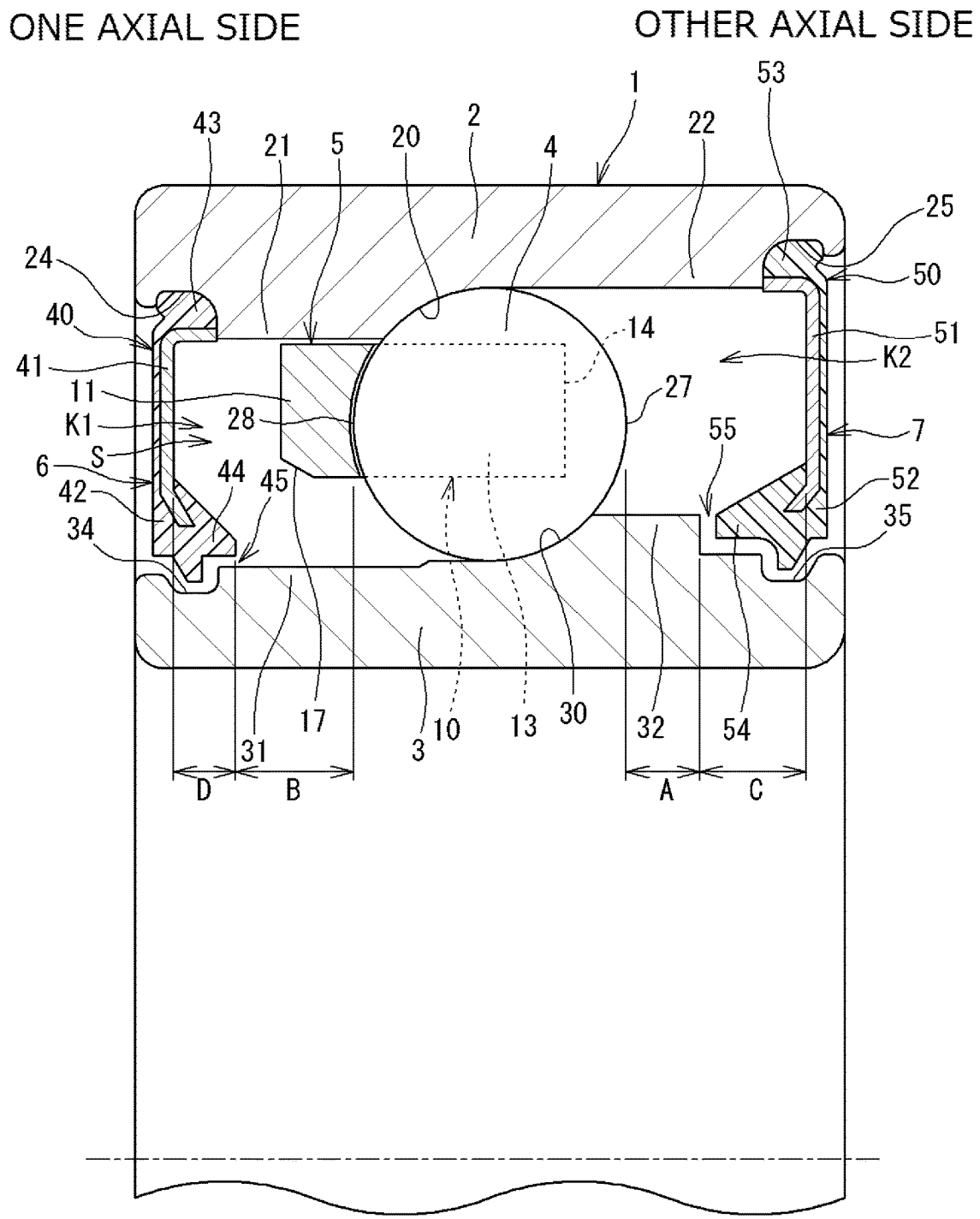
FIG. 1 is a sectional view illustrating a rolling bearing according to one embodiment of the present invention.

FIG. 1 is a sectional view illustrating a rolling bearing according to one embodiment of the present invention. This rolling bearing is an angular contact ball bearing 1, which includes an outer ring 2, an inner ring 3, a plurality of balls (rolling elements) 4, an annular cage 5, a first sealing device 6, and a second sealing device 7. An annular space S formed between the outer ring 2 and the inner ring 3 is filled with grease. That is, grease lubrication is employed in the angular contact ball bearing 1. The angular contact ball bearing 1 of this embodiment is used under a condition that involves high-speed rotation. Specifically, the angular contact ball bearing 1 is used under an environment that involves high-speed rotation with a dmn value of 1,000,000 or more and 2,000,000 or less. The angular contact ball bearing 1 is used under a high-temperature environment in which the maximum temperature ranges from 100° C. to 150° C. In the following description, the terms "one axial side" and "other axial side" are used to indicate positions in an axial direction. One axial side is a left side in FIG. 1, and the other axial side is a right side in FIG. 1.

An outer ring raceway groove 20 is formed on the inner peripheral surface of the outer ring 2. The balls 4 roll along the outer ring raceway groove 20. The balls 4 are in contact with the outer ring raceway groove 20 at a predetermined contact angle. The outer ring 2 has a first outer shoulder portion 21 and a second outer shoulder portion 22 on both axial sides across the outer ring raceway groove 20. In this embodiment, a bore diameter (shoulder diameter) of the second outer shoulder portion 22 is larger than a bore diameter (shoulder diameter) of the first outer shoulder portion 21. A first groove 24 for fixing the first sealing device 6 is formed at one axial end of the first outer shoulder portion 21. A second groove 25 for fixing the second sealing device 7 is formed at the other axial end of the second outer shoulder portion 22. The inner peripheral surface of the outer ring 2 has a shape in which the bore diameter increases from one axial side toward the other axial side as a whole (except the areas where the first groove 24 and the second groove 25 are formed). The first outer shoulder portion 21 adjacent to the first groove 24 has the smallest diameter, and the second outer shoulder portion 22 adjacent to the second groove 25 has the largest diameter.

An inner ring raceway groove 30 is formed on the outer peripheral surface of the inner ring 3. The balls 4 roll along the inner ring raceway groove 30. The balls 4 are in contact with the inner ring raceway groove 30 at a predetermined contact angle. The inner ring 3 has a first inner shoulder portion 31 and a second inner shoulder portion 32 on both axial sides across the inner ring raceway groove 30. In this embodiment, an outside diameter (shoulder diameter) of the second inner shoulder portion 32 is larger than an outside diameter (shoulder diameter) of the first inner shoulder portion 31. A first seal groove 34 is formed at one axial end of the first inner shoulder portion 31. A second seal groove 35 is formed at the other axial end of the second inner shoulder portion 32. The outer peripheral surface of the inner ring 3 has a shape in which the outside diameter increases from one axial side toward the other axial side as a whole (except the areas where the seal grooves 34 and 35 are formed). The first inner shoulder portion 31 adjacent to the first seal groove 34 has the smallest diameter. The second inner shoulder portion 32 adjacent to the second seal groove 25 has the largest diameter. As in the case of the outer ring 2 of this embodiment, an outer ring in which the shoulder diameters on one axial side and the other axial side are different from each other is hereinafter referred to as a counterbored outer ring. As in the case of the inner ring 3 of this embodiment, an inner ring in which the shoulder diameters on one axial side and the other axial side are different from each other is hereinafter referred to as a stepped inner ring.

The balls 4 are provided in the annular space S between the outer ring 2 and the inner ring 3. When the angular contact ball bearing 1 rotates (when the inner ring 3 rotates in this embodiment), the balls 4 roll along the outer ring raceway groove 20 and the inner ring raceway groove 30 while being retained by the cage 5.

Figure 2:
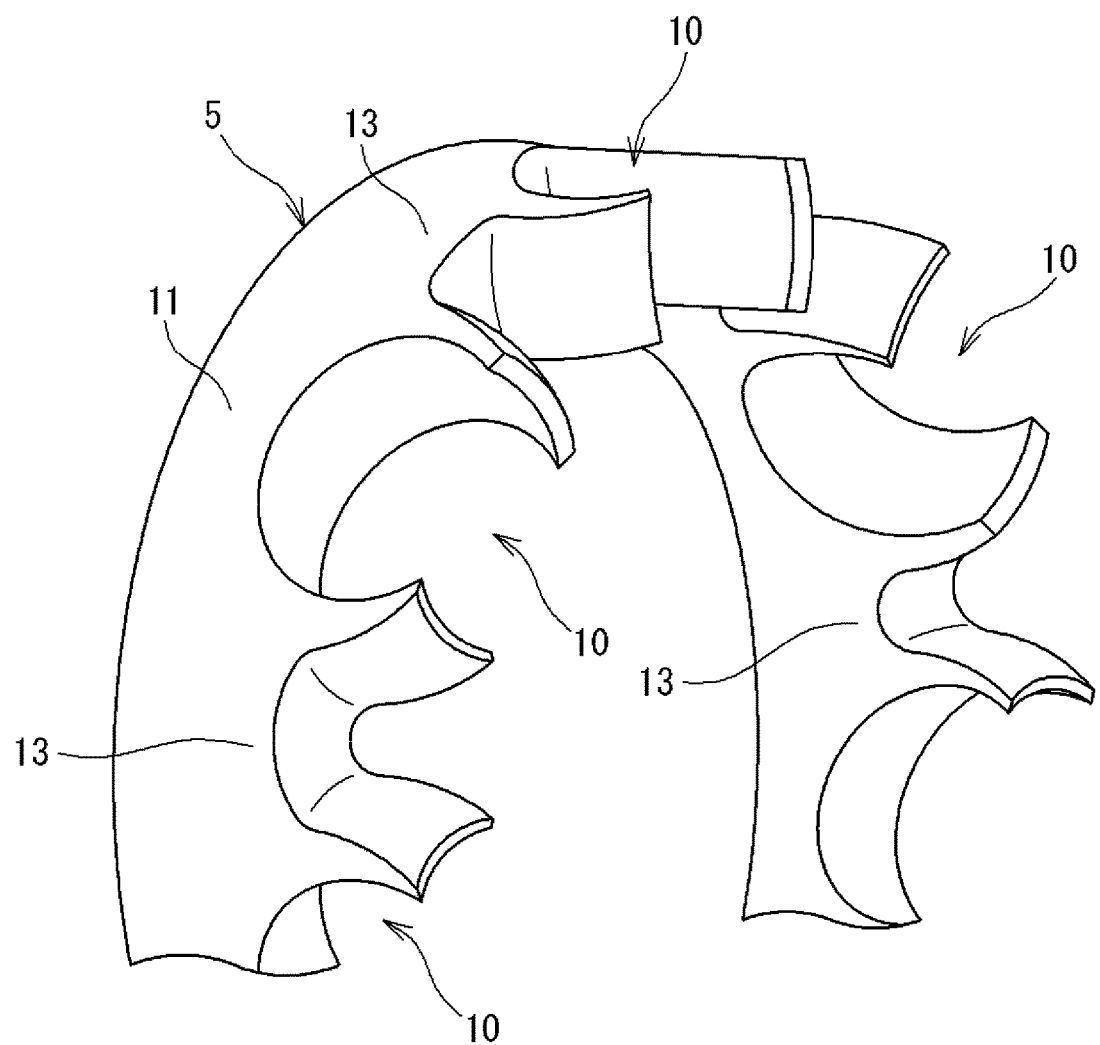
FIG. 2 is a perspective view illustrating a part of a cage.

FIG. 2 is a perspective view illustrating a part of the cage 5. In FIG. 1 and FIG. 2, the cage 5 can retain the balls 4 at predetermined intervals (regular intervals) along a circumferential direction. Therefore, the cage 5 has a plurality of cage pockets 10 formed along the circumferential direction. The cage pockets 10 house the balls 4. The cage 5 has an annular body (annular portion) 11 and a plurality of cage prongs (cage bars) 13. The annular body 11 is provided on one axial side of the balls 4. The cage prongs 13 are provided so as to extend from the annular body 11 to the other axial side. The cage pocket 10 that houses the ball 4 is formed on the other axial side of the annular body 11 and between the cage prongs 13 and 13 adjacent to each other in the circumferential direction. That is, the cage 5 is a so-called snap cage, and the cage pocket 10 is open to the other axial side. The cage 5 of this embodiment is formed of a resin such as polyether ether ketone (PEEK), polyamide (PA) 46, or polyphenylene sulfide (PPS).

In FIG. 1, the other axial end 14 of the cage prong 13 is located on one axial side with respect to the other axial end position 27 of the ball 4, and the cage prong 13 is short in the axial direction. A part of the cage 5 on an outer peripheral side is configured to come into contact with a part of the outer ring 2 on an inner peripheral side. The cage 5 of this embodiment is an outer-ring guide type cage, which is positioned in a radial direction by the outer ring 2. That is, when the bearing rotates, the outer peripheral surface of the annular body 11 can be brought into sliding contact with the inner peripheral surface of the first outer shoulder portion 21. A chamfer 17 is provided on one axial side and the inner ring 3 side of the annular body 11.

The first sealing device 6 includes an annular core 41 and a seal body 42. The seal body 42 is fixed to the core 41. The core 41 is formed of a metal, and the seal body 42 is formed of a rubber. The seal body 42 has a radially outer edge 43 and a lip portion (first lip portion) 44. The radially outer edge 43 is attached to the first groove 24. The lip portion 44 faces the seal groove 34 with a clearance. By fitting and fixing the radially outer edge 43 to the first groove 24, the first sealing device 6 is attached to the outer ring 2. The core 41 and the radially outer edge 43 constitute an attachment portion 40 that is attached to the outer ring 2. The first lip portion 44 protrudes from a radially inner edge of the attachment portion 40 toward the balls 4. A slight clearance is formed between the first lip portion 44 and the seal groove 34. This clearance serves as a first labyrinth clearance 45. With the structure described above, the first sealing device 6 is a labyrinth seal (non-contact seal).

Figure 3:
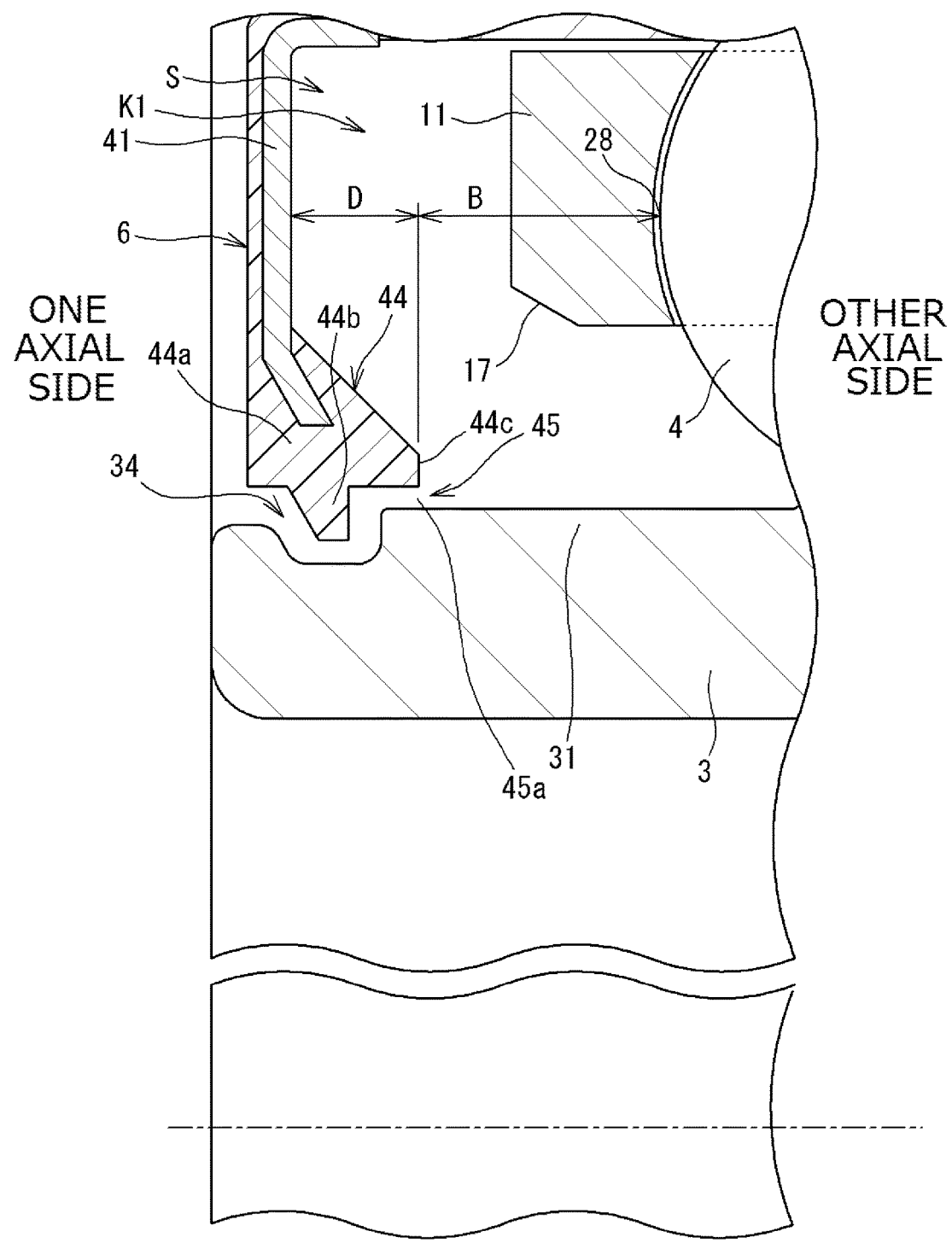
FIG. 3 is a sectional view illustrating a first lip portion and its periphery.

FIG. 3 is a sectional view illustrating the first lip portion 44 and its periphery. An entrance 45a of the first labyrinth clearance 45 is formed between an end 44c of the first lip portion 44 on the ball 4 side and the first inner shoulder portion 31. The entrance 45a is narrow, thereby suppressing passage of the grease. In this embodiment, the other axial position of the entrance 45a is defined as a sealing position of the first sealing device 6. An axial dimension between the sealing position on the first lip portion 44 side (other axial position of the entrance 45a) and the attachment portion 40 (other axial position of the edges of the core 41 and the first lip portion 44) is represented by "D".

In FIG. 1, the second sealing device 7 includes an annular core 51 and a seal body 52. The seal body 52 is fixed to the core 51. The core 51 is formed of a metal, and the seal body 52 is formed of a rubber. The seal body 52 has a radially outer edge 53 and a lip portion (second lip portion) 54. The radially outer edge 53 is attached to the second groove 25. The lip portion 54 faces the seal groove 35 with a clearance. By fitting and fixing the radially outer edge 53 to the second groove 25, the second sealing device 7 is attached to the outer ring 2. The core 51 and the radially outer edge 53 constitute an attachment portion 50 that is attached to the outer ring 2. The second lip portion 54 protrudes from a radially inner edge of the attachment portion 50 toward the balls 4. A slight clearance is formed between the second lip portion 54 and the seal groove 35. This clearance serves as a second labyrinth clearance 55. With the structure described above, the second sealing device 7 is a labyrinth seal (non-contact seal).

Figure 4:
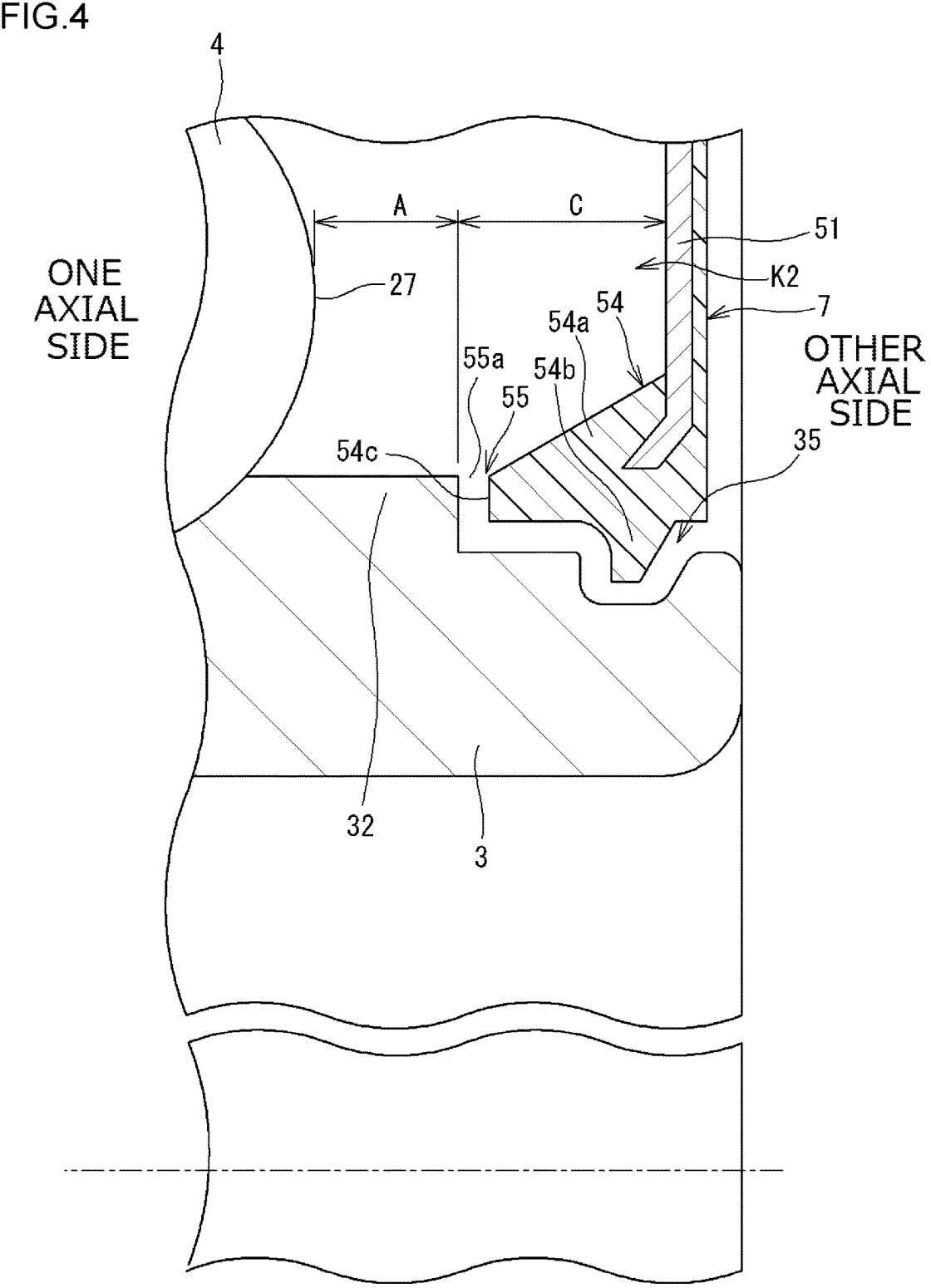
FIG. 4 is a sectional view illustrating a second lip portion and its periphery.

FIG. 4 is a sectional view illustrating the second lip portion 54 and its periphery. An entrance 55a of the second labyrinth clearance 55 is formed between an end 54c of the second lip portion 54 on the ball 4 side and the second inner shoulder portion 32. The entrance 55a is narrow, thereby suppressing passage of the grease. In this embodiment, one axial position of the entrance 55a is defined as a sealing position of the second sealing device 7. An axial dimension between the sealing position on the second lip portion 54 side (one axial position of the entrance 55a) and the attachment portion 50 (one axial position of the edges of the core 51 and the second lip portion 54) is represented by "C".

In this embodiment (see FIG. 1, FIG. 3, and FIG. 4), the first sealing device 6 and the second sealing device 7 have different shapes, and the axial dimension C on the other axial side is larger than the axial dimension D on one axial side (D<C). As illustrated in FIG. 3, the first lip portion 44 of the first sealing device 6 has a body portion 44a and a protruding portion 44b. A part of the body portion 44a is fixed to the core 41. The protruding portion 44b protrudes radially inward from an inner peripheral side of the body portion 44a. Only the protruding portion 44b is housed in the first seal groove 34. As illustrated in FIG. 4, the second lip portion 54 of the second sealing device 7 has a body portion 54a and a protruding portion 54b. A part of the body portion 54a is fixed to the core 51. The protruding portion 54b protrudes radially inward from an inner peripheral side of the body portion 54a. Both of the body portion 54a and the protruding portion 54b are housed in the second seal groove 35. A path length of the second labyrinth clearance 55 illustrated in FIG. 4 is larger than a path length of the first labyrinth clearance 45 illustrated in FIG. 3. The path length of the first labyrinth clearance 45 may be defined as a length of the clearance within a range in which the first lip portion 44 faces the first inner shoulder portion 31 and the first seal groove 34 in the axial cross section illustrated in FIG. 3. More specifically, the first labyrinth clearance 45 is a space formed between the area including the inner peripheral surface of the body portion 44a and the inner peripheral surface and the faces of the protruding portion 44b of the first lip portion 44 and the area including the first inner shoulder portion 31 and the first seal groove 34 at portions located in a direction orthogonal to the inner peripheral surfaces and the faces. The path length may be defined as a mean value of the length of the first lip portion 44 in the axial cross section and the length of the first seal groove 34 in the axial cross section within the space. The path length of the second labyrinth clearance 55 may be defined as a length of the clearance within a range in which the second lip portion 54 faces the second seal groove 35 in the axial cross section illustrated in FIG. 4. More specifically, the second labyrinth clearance 55 is a space formed between the area including the inner peripheral surface of the body portion 54a, the face of the end 54c, and the inner peripheral surface and the faces of the protruding portion 54b of the second lip portion 54 and the area including the second seal groove 35 at a portion located in a direction orthogonal to the inner peripheral surfaces and the faces. The path length may be defined as a mean value of the length of the second lip portion 54 in the axial cross section and the length of the second seal groove 35 in the axial cross section within the space.

In the angular contact ball bearing 1 illustrated in FIG. 1, when the inner ring 3 rotates, an action that forces the grease from one axial side to the other axial side (from the left side to the right side in FIG. 1) occurs in the annular space S (pumping action). In this embodiment, an action that forces the grease from one axial side (first inner shoulder portion 31 side) to the other axial side (second inner shoulder portion 32 side) along the outer peripheral surface of the inner ring 3 is caused by the shape of the stepped inner ring 3. The action that forces the grease from one axial side to the other axial side is also caused by the shape of the counterbored outer ring 2. The movement of the grease in the same direction is also caused by spinning (rotation) of the revolving balls 4. This action intensifies particularly when the bearing rotates at a high speed. The grease in the annular space S concentrates in a space K2 on the other axial side rather than a space K1 on one axial side, thereby causing imbalance in the grease. Therefore, the second sealing device 7 prevents the grease that concentrates in the space K2 from leaking to the outside of the bearing.

According to the angular contact ball bearing 1 having the structure described above, the cage 5 is a so-called snap cage having the annular body 11 only on one axial side. Therefore, even if the action that forces the grease from one axial side to the other axial side occurs in the annular space S between the inner ring 3 and the outer ring 2, it is unlikely that the grease is agitated because the annular body of the cage 5 is not provided in the space K2 on the other axial side. Thus, the leakage of the grease from the second sealing device 7 on the other axial side can be suppressed to the extent possible. In this embodiment, the second sealing device 7 is a labyrinth seal, which has a higher possibility of grease leakage than a contact seal. However, as described above, the grease is not agitated in the space K2 on the other axial side, and thus the leakage of the grease due to the agitation can be suppressed to the extent possible. In particular, the other axial end 14 of the cage prong 13 of the cage 5 is located on one axial side with respect to the other axial end position 27 of the ball 4, and the cage prong 13 is short in the axial direction. Therefore, it is more unlikely that the grease is agitated in the space K2 on the other axial side due to the rotation of the cage 5. Thus, the leakage of the grease due to the agitation can be suppressed effectively. The cage 5 (annular body) is not provided in the space K2 on the other axial side, and therefore shearing of the grease is suppressed in the space K2 on the other axial side. Thus, a decrease in the life of the grease can be prevented as well.

In this embodiment, the center of the ball 4 is arranged at the center of the bearing in the axial direction, and the axial lengths on one axial side and the other axial side of the angular contact ball bearing 1 are equal to each other across the ball 4. However, as described above, the path length of the second labyrinth clearance 55 on the other axial side is larger than the path length of the first labyrinth clearance 45 on one axial side. That is, the second lip portion 54 of the second sealing device 7 is upsized to increase the sealing performance. The path length of the first labyrinth clearance 45 on one axial side is not increased, thereby preventing an increase in the axial dimension of the angular contact ball bearing 1.

When the second lip portion 54 is upsized, the sealing position of the second sealing device 7 (entrance 55*a*; see FIG. 4) is closer to the ball 4. That is, an axial dimension between one axial end position 28 of the ball 4 and the sealing position of the first sealing device 6 (other axial position of the entrance 45*a*) is represented by "B" in FIG. 3, and an axial dimension between the other axial end position 27 of the ball 4 and the sealing position of the second sealing device 7 (one axial position of the entrance 55*a*) is represented by "A" in FIG. 4. Then, the axial dimension "A" is smaller than the axial dimension "B" as illustrated in FIG. 1.

Thus, on the other axial side (see FIG. 4), the ball 4 and the second labyrinth clearance 55 (entrance 55*a*) are closer to each other (as compared to one axial side (FIG. 3)). However, as described above, the annular body of the cage 5 is not provided in the space K2 on the other axial side, and thus the leakage of the grease due to the agitation of the grease can be suppressed. On one axial side (see FIG. 3), the ball 4 and the first labyrinth clearance 45 (entrance 45*a*) are distant from each other. Thus, even if the grease is agitated by the annular body 11, it is unlikely that influence of the agitation reaches the first labyrinth clearance 45 and the grease leaks. In this embodiment, the chamfer 17 is provided on one axial side and the inner ring 3 side of the annular body 11. Therefore, the distance between the sealing position of the first sealing device 6 (entrance 45*a*) and the cage 5 (annular body 11) can be increased. Thus, even if the grease is agitated by the annular body 11, it is unlikely that influence of the agitation reaches the first labyrinth clearance 45 and the grease leaks.

In this embodiment, as described above, the axial dimension between the sealing position of the first lip portion 44 (other axial position of the entrance 45*a*) and the core 41 of the first sealing device 6 (see FIG. 3) is represented by "D", and the axial dimension between the sealing position of the second lip portion 54 (one axial position of the entrance 55*a*) and the core 51 of the second sealing device 7 (see FIG. 4) is represented by "C". The axial dimension "C" on the other axial side is larger than the axial dimension "D" on one axial side (C>D). Therefore, the space K2 on the other axial side of the ball 4 can be expanded. As a result, even if a large amount of grease concentrates in the space K2 on the other axial side due to the pumping action, the grease can be housed in the space K2. Thus, it is possible to suppress the leakage of the grease from the second sealing device 7 due to an increase in the amount of the grease on the other axial side. In the annular space S, the space K2 on the other axial side of the ball 4 is filled with a larger amount of grease (than the space K1 on one axial side).

In this embodiment, the angular contact ball bearing 1 can be used under an environment that involves high-speed rotation with a dmn value of 1,000,000 or more and 2,000,000 or less. Even if the rolling bearing is used under such an environment that involves high-speed rotation, the leakage of the grease can be suppressed by the respective structures described above. In this embodiment, the first sealing device 6 and the second sealing device 7 are non-contact sealing devices (labyrinth seals), and thus the bearing is suitable for high-speed rotation.

A part of the cage 5 on the outer peripheral side is configured to come into contact with a part of the outer ring 2 on the inner peripheral side. Therefore, even if the angular contact ball bearing 1 is used under the environment that involves high-speed rotation as described above, the cage 5 is stably guided by the outer ring 2. Thus, troubles such as vibrations can be prevented. In general, the snap cage is a rolling-element guide type cage, which is positioned by the balls (in this embodiment, the snap cage is an outer-ring guide type cage). In the case of the rolling-element guide type cage, when the bearing rotates at a high speed and the centrifugal force increases to deform the cage, the balls are brought into significant contact with the cage pocket surfaces, thereby causing an increase in rotational resistance and heat generation. Therefore, the snap cage is not often employed for rolling bearings in applications to high-speed rotation. Although the cage 5 is the snap cage in this embodiment, the cage 5 can be used in the applications to high-speed rotation by employing the outer-ring guide type cage.

The embodiment disclosed above is illustrative but is not limitative in all respects. That is, the rolling bearing of the present invention is not limited to the illustrated embodiment, but other embodiments may be employed within the scope of the present invention. For example, the rolling element is the ball 4, but may be a roller. In the embodiment described above, the action that forces the grease from one axial side to the other axial side due to the rotation of the bearing is caused by the factors of (1) the shape of the stepped inner ring 3, (2) the shape of the counterbored outer ring 2, and (3) spinning of the balls 4. The present invention is applicable to a rolling bearing in which the action that forces the grease from one axial side to the other axial side is caused by at least one of the factors of (1), (2), and (3).

According to the rolling bearing of the present invention, it is unlikely that the grease is agitated because the annular body of the cage is not provided on the other axial side. Thus, the leakage of the grease from the sealing device on the other axial side can be suppressed.

What is claimed is:
1. A rolling bearing, comprising:
an inner ring;
an outer ring;
a plurality of rolling elements provided between the inner ring and the outer ring;
a cage configured to retain the rolling elements; and
sealing devices provided on one axial side and an other axial side of an annular space formed between the inner ring and the outer ring,
the rolling bearing having a structure in which an action that forces grease from the one axial side to the other axial side occurs in the annular space, wherein
the cage includes:
an annular body provided on the one axial side; and
a plurality of cage prongs provided so as to extend from the annular body to the other axial side,
cage pockets that house the rolling elements are each formed on the other axial side of the annular body and between the cage prongs adjacent to each other in a circumferential direction,
the cage pockets are open to the other axial side, and
a part of the cage on an outer peripheral side and on the one axial side is positioned relative to the outer ring in order to come into contact with a part of the outer ring on an inner peripheral side.
2. The rolling bearing according to claim 1, wherein the sealing devices on the one axial side and the other axial side are labyrinth seals.

3. The rolling bearing according to claim 2, wherein a path length of a second labyrinth clearance on the other axial side is larger than a path length of a first labyrinth clearance on the one axial side.

4. The rolling bearing according to claim 1, wherein an axial dimension between a sealing position of the sealing device on the other axial side and the rolling element is smaller than an axial dimension between a sealing position of the sealing device on the one axial side and the rolling element.

5. The rolling bearing according to claim 1, wherein the other axial end of the cage prong is located on the one axial side with respect to the other axial end position of the rolling element.

6. The rolling bearing according to claim 1, wherein the rolling bearing is used under an environment that involves high-speed rotation with a dmn value of 1,000,000 or more and 2,000,000 or less.

7. The rolling bearing according to claim 1, wherein
  each of the sealing devices on the one axial side and the other axial side includes:
    an attachment portion that is attached to the outer ring; and
    a lip portion that protrudes from the attachment portion toward the rolling elements, and
  a chamfer is provided on the one axial side and the inner ring side of the annular body.

8. The rolling bearing according to claim 1, wherein
  each of the sealing devices on the one axial side and the other axial side includes:
    an attachment portion that is attached to the outer ring; and
    a lip portion that protrudes from the attachment portion toward the rolling elements, and
  an axial dimension between a sealing position of the sealing device on the other axial side and the attachment portion of the sealing device on the other axial side is larger than an axial dimension between a sealing position of the sealing device on the one axial side and the attachment portion of the sealing device on the one axial side.

9. The rolling bearing according to claim 1, wherein
  the inner ring includes an inner ring raceway groove, a first inner shoulder portion on the one axial side of the inner ring raceway groove and a second inner shoulder portion on the other axial side of the inner ring raceway groove, and
  an outer peripheral surface of the inner ring has a shape in which an outside diameter of the first inner shoulder portion, the inner ring raceway groove and the second inner shoulder portion increases from the one axial side toward the other axial side as a whole.

* * * * *